(...)

United States Patent [19]

Fouts

[11] Patent Number: 4,817,996

[45] Date of Patent: Apr. 4, 1989

[54] ADJUSTABLE REUSABLE FITTING ASSEMBLY FOR REINFORCED HOSE

[75] Inventor: Robert E. Fouts, Rancho Palos Verdes, Calif.

[73] Assignee: Earl's Supply Co., Carson, Calif.

[21] Appl. No.: 92,067

[22] Filed: Sep. 2, 1987

[51] Int. Cl.$^4$ ............................................. F16L 39/02
[52] U.S. Cl. .................................... 285/149; 285/179; 285/276; 285/305
[58] Field of Search ............... 285/149, 305, 276, 388, 285/179

[56] References Cited

U.S. PATENT DOCUMENTS

| | | | |
|---|---|---|---|
| 2,638,361 | 5/1953 | Melsom | 285/149 |
| 3,142,498 | 7/1964 | Press | 285/305 X |
| 3,752,506 | 8/1973 | Fouts | 285/149 |
| 4,653,780 | 3/1987 | Lalikos | 285/305 X |

FOREIGN PATENT DOCUMENTS

| | | | |
|---|---|---|---|
| 734830 | 5/1966 | Canada | 285/149 |
| 718261 | 11/1954 | United Kingdom | 285/149 |
| 2095779 | 10/1982 | United Kingdom | 285/305 |

Primary Examiner—Thomas F. Callaghan
Attorney, Agent, or Firm—Poms, Smith, Lande & Rose

[57] ABSTRACT

An adjustable and detachable fitting assembly for reinforced hose having an inner fluid sealing tube and an outer reinforcement. The assembly has a nipple insertible into the tube and a sleeve surrounding the nipple but spaced therefrom so that a cutting edge on the sleeve separates the tube structure allowing one separated portion of the tube to fill the space between the sleeve and nipple with the outer separated portion of the tube and the reinforcement filling a space between the outer surface of the sleeve and a socket threaded thereto. The sleeve rotates about the nipple and is longitudinally adjustable with respect thereto while maintaining connection of the sleeve to the nipple. This allows for compensation for misalignment.

7 Claims, 2 Drawing Sheets

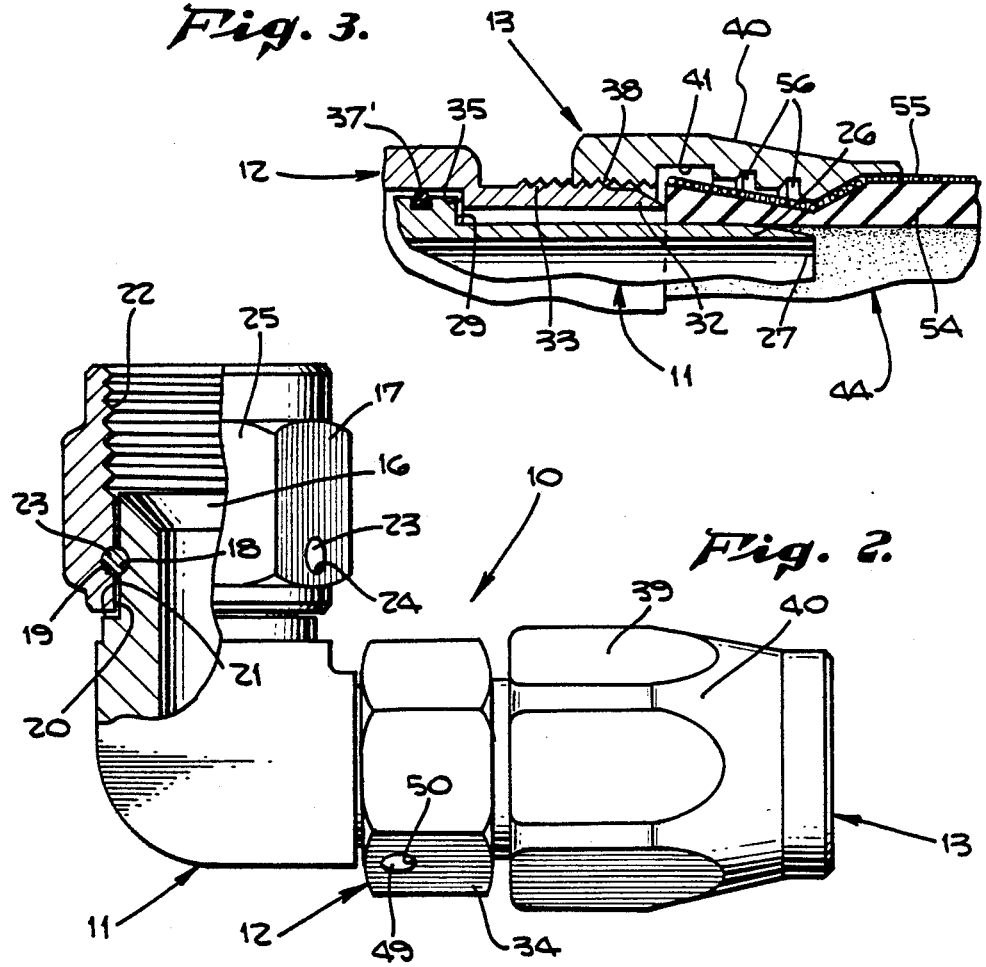
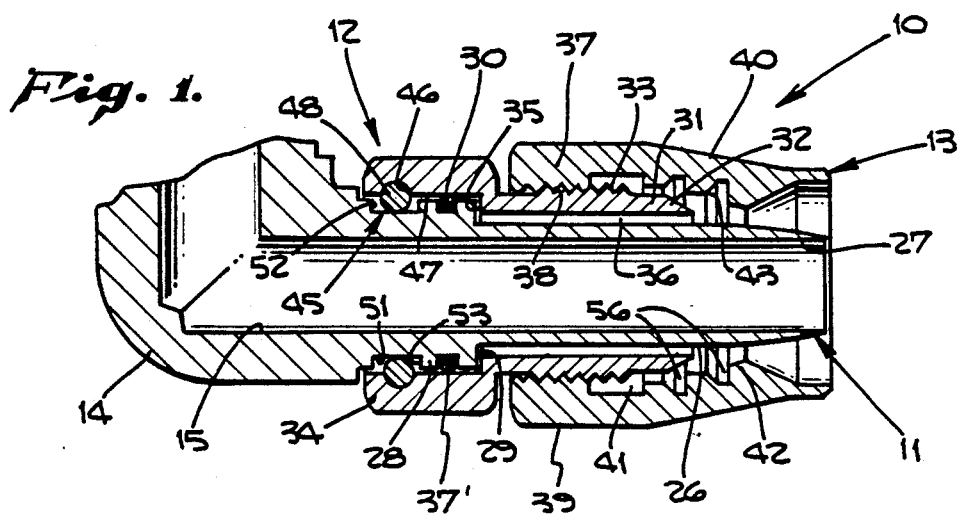

ADJUSTABLE REUSABLE FITTING ASSEMBLY FOR REINFORCED HOSE

BACKGROUND OF THE INVENTION

1. Field of the Invention

The invention relates to hose fitting assemblies; and, more particularly, to detachable reusable fitting assemblies for fluid connection to a reinforced hose.

2. Description of the Prior Art

In my U.S. Pat. No. 3,752,506, I disclose a fitting assembly for reinforced hose. This assembly provides a fluid tight seal with reinforced hose having an inner fluid sealing tube and an outer tubular reinforcement. The fitting assembly disclosed in my patent is of the lip-seal detachable and reusable type and includes a nipple having a received in the fluid sealing tube. The nipple also has an integral enlarged diameter portion, and a shoulder portion joining the cylindrical portions, the enlarged portion outer surface having an annular O-ring recess therein axially adjacent the shoulder. An annular connector wire recess is provided on the surface thereof and spaced axially away from the shoulder. A swivel adapter having external threads, is provided, the adapter including a nut portion with an inner diameter of the sleeve portion so as to define an internal annular shoulder. The inner diameter of the nut portion is only slightly larger than the external diameter of the enlarged portion of the nipple for receiving the enlarged portion in snug relation, the inner surface of the nut portion having an annular connector wire recess therein. A wire connector is disposed in the annular wire recesses when in registry to prevent relative axial movement between the adapter and nipple but permitting relative rotation therebetween. An O-ring is disposed in the O-ring recess, and a socket receives therein the adapter sleeve portion and the nipple elongated cylindrical portion. The socket has an internally threaded section adjacent one end for threaded engagement with the adapter and an intermediate section with a diameter greater than the external diameter of the adapter sleeve portion so as to define a second annular space receiving the hose outer tubular reinforcement and a portion of the hose inner tubing. A remaining section of the adapter has an axially rearwardly decreasing diameter and means for gripping the reinforcement when the socket is axially advanced by threaded engagement with the sleeve thereby forcing a portion of the hose inner tube into the first annular space between the sleeve and nipple and forcing a portion of the hose inner tube and the reinforcement into the second annular space between the sleeve and the socket.

Although a certain amount of misalignment can be compensated for in the fitting assembly disclosed in my patent due to the rotation or swiveling of parts, there is no linear adjustment. Thus, there is a need for allowing the nipple of my patented swivel assembly to move in and out in the direction of its longitudinal axis thus allowing like linear adjustment of the final hose assembly. Such feature would make the fitting assembly of my patent quite versatile since the combination of the swivel and limited linear adjustment would compensate for many misalignment problems.

SUMMARY OF THE INVENTION

It is an object of this invention to provide an improved fitting assembly for reinforced hose.

It is a further object of this invention to provide a fitting assembly having limited longitudinal adjustment along with rotational relationship of the parts to compensate for misalignment of the hose assembly.

These and other objects are preferably accomplished by providing an adjustable and detachable fitting assembly for reinforced hose having an inner fluid sealing tube and an outer reinforcement. The assembly has a nipple insertible into the tube and a sleeve surrounding the nipple but spaced therefrom so that a cutting edge in the sleeve separates the tube structure allowing one separated portion of the tube to fill the space between the sleeve and nipple with the other separated portion of the tube and the reinforcement filling a space between the outer surface of the sleeve and a socket threaded thereto. The sleeve rotates about the nipple and is longitudinally adjustable with respect thereto while maintaining connection of the sleeve to the nipple. This allows for compensation for misalignment.

BRIEF DESCRIPTION OF THE DRAWING

FIG. 1 is an exemplary embodiment in cross-section of a fitting assembly having a nipple attached to a forged elbow connection in accordance with the invention;

FIG. 2 is a vertical view, partly in section, of the fitting assembly of FIG. 1;

FIG. 3 is a partial sectional view showing the start of engagement of the reinforced hose with the fitting shown in FIGS. 1 and 2;

DESCRIPTION OF THE PREFERRED EMBODIMENTS

Figures 4, 5, 6, 7:
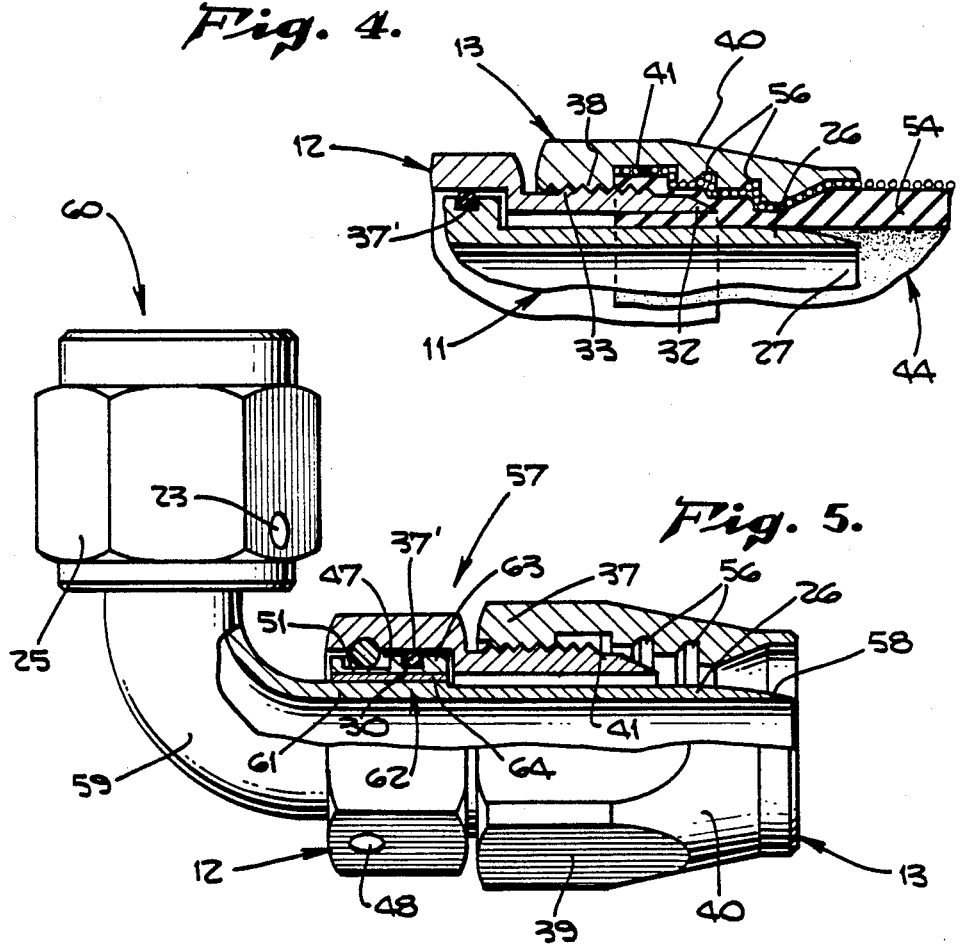
FIG. 4 is a partial sectional view as in FIG. 3 showing the fitting completely assembled.
FIG. 5 is a vertical view, partly in section, of a second exemplary embodiment of a fitting with the nipple integral with a bent tube elbow connection.
FIG. 6 is a vertical view, partly in section, of a portion of a third exemplary embodiment of a straight sealed fitting for reinforced hose with a female end fitting in accordance with the invention.
FIG. 7 is a partial view of the embodiment of FIG. 6 showing a male end fitting integral with the nipple thereof.

Referring now to FIG. 1 of the drawing, a sealed fitting assembly 10 for reinforced hose is disclosed. Assembly 10 includes a nipple 11, a swivel adapter 12, and a socket 13. Nipple 11 is part of an elbow body 14 and a throughbore 15 extends through nipple 11 and body 14. The elbow body 14 terminates in an outwardly flared opening at end 16 (FIG. 2). A coupling member 17 is rotatably connected to end 16. This is accomplished by providing an annular groove 18 on the outer surface of elbow body 14 adjacent end 16 and a like mating annular groove 19 on the inner wall of coupling member 17. The end 16 of elbow body 14 may be of an outer diameter less than the outer diameter of the remainder of elbow body 14 forming a reduced area 20 in which groove 18 is provided. Thus, a shoulder 21 is formed and coupling member 17 can abut thereagainst. The interior of coupling member 17 is threaded at threaded section 22 and a wire member 23 is disposed in mating grooves 18, 19. As is well known in the art, this wire member 23 extends through a hole in coupling member 17 which hole opens at the exterior of member 17 (as at opening 24—FIG. 2), the end of wire member 23 terminating thereat. The exterior of coupling member 17 is a nut as seen at flats 25 in FIG. 2. Thus, coupling member 17 is permanently and axially connected to elbow body 14 yet rotates or swivels with respect thereto.

Nipple 11 includes an elongated generally cylindrical portion 26 having a smooth forward edge 27. The nipple 11 further includes an integral enlarged cylindrical portion 28 having an outer diameter greater than the outer diameter of portion 26 but with the same inner diameter. A shoulder 29 is formed at the intersection of portions 26 and 28. The exterior surface of portion 28 is provided with an annular O-ring recess 30.

The swivel adapter 12 includes a cylindrical sleeve portion 31 having a sharp forward edge 32. Sleeve portion 31 has an internal diameter greater than the external diameter of the elongated cylindrical portion 26 of nipple 11. External threads 33 are provided on the exterior surface of sleeve portion 31.

Swivel adapter 12 also includes an integral nut portion 34 (see also FIG. 2) of hexagonal configuration. The internal diameter of nut portion 34 is greater than the internal diameter of sleeve portion 31 and a shoulder 35 is provided at the junction thereof. An annular space 36 is formed between the inner surface of the sleeve portion 31 of swivel adapter 12 and the exterior surface of the cylindrical portion 26 of nipple 11 as seen in FIG. 1. An O-ring 37' is positioned in the annular recess 30 of nipple 11 when the parts are assembled and the swivel adapter 12 is positioned as shown in FIG. 1.

Assembly 10 further includes socket 13 having a forward internally threaded section 37 including threads 38 for mating engagement with the external threads 33 of swivel adapter 12. The exterior of the threaded section 37 forms a conventional hexagonal nut surface 39 (see also FIG. 2) so that socket 13 may be tightened relative to swivel adapter 12. Socket 13 further includes an intermediate section 40 which, when socket 13 is threaded onto swivel adapter 12 as seen in FIG. 1, defines an annular space 41 between the exterior surface of the sleeve portion 31 of adapter 12 and the internal surface of socket portion intermediate section 40. Socket 13 also includes an axially rearwardly decreasing outer diameter section 42 which includes gripping means 43 for gripping the outer tubular reinforcement of a hose 44 as seen in FIG. 3 and as will be discussed further hereinbelow. Further, rearwardly of gripping means 43, the internal diameter of socket 13 is again increased to a diameter which will accommodate the hose with which the fitting assembly is to be used.

As particularly contemplated in the present invention, limited longitudinal adjustment movement and axial rotation means 45 are provided for both allowing limited longitudinal adjustment of assembly 10 and rotational or swivel coupling means of the swivel adapter 12 to the nipple 11. Such means 45 includes an annular groove or recess 46 on the inner surface 47 of nut portion 34 receiving therein a connector wire member 48 which is inserted through a suitable opening in the nut portion 34 of swivel adapter 12 as is well known in the art, having the end 49 thereof (FIG. 2) terminating at opening 50 on the exterior outer surface of nut portion 34.

Means 45 further includes an elongated annular groove 51 formed in the outer surface of enlarged portion 28. Abutment shoulders 52, 53 define the axial limits of groove 51 and act as a stop for wire member 48. That is, the elbow body 14 and coupling member 17 are longitudinally axially adjustable with respect to swivel adapter 12 and the parts coupled thereto. This provides limited axial adjustment of the parts between shoulders 52, 53. At the same time, the swivel adapter 12 is axially secured to nipple 11 while allowing adapter 12 to be rotated relative to nipple 11. Thus, the improved fitting assembly 10 disclosed herein is quite versatile allowing both swiveling of the parts and limited axial adjustment to compensate for misalignment.

Referring now to FIGS. 3 and 4, it can be seen that the fitting assembly 10 is assembled by first placing socket 13 over the end of hose 44 (having an inner rubber or elastomeric tube 54 and an outer tubular reinforcement 55 of conventional wire braid) so that the forward edge of the hose 44 extends into the space 41 of of socket 13 at which time the socket 13 and hose 44 are in position to be mated with the nipple 11 and swivel adapter 12.

As seen best in FIG. 3, during assembly, the smaller diameter elongated cylindrical portion 26 of the nipple 11 is inserted into the hose inner tube 54 and the external diameter of the nipple portion 26 is only slighter larger than the internal diameter of the inner tube 54 so that the nipple 11 may be freely but snugly forced into the hose 44. As the threads of the socket 38 begin to engage the external threads 33 of the swivel adapter 12, the sharpened forward edge 32 of the swivel adapter 12 engages the forward face of the inner tube 54 of the hose 44 as seen in FIG. 3. When the swivel adapter 12 is rotated relative to the socket 13 during threading engagement, the rotational motion of the forward edge 32 of the swivel adapter 12 will cut into the forward face of the hose lip so as to form an inner and outer flap as seen best in FIG. 4. The inner flap completely fills the annular space 41 and the outer flap, together with the outer tubular reinforcement 55, is forced radially outwardly into the intermediate portion 40 of the socket 13 as well as into the grooves 56 which constitute the means for gripping the hose. It will now be apparent that a lip seal is formed along the engaging faces of the outer surface of the nipple portion 26 and the inner face of the inner tube 54 which forms the primary seal. Any fluid which may pass such seal is retained by the fitting assembly 10 by virtue of the O-ring 37' which provides a second or supplementary seal at one end of the fitting assembly 10 and of course both the inner and outer surfaces of the sleeve portion of the swivel adapter 12 which are in engagement with the inner and outer flaps cut into the lip of the hose 44 to provide a second seal at the opposite end of the fitting.

The means 45 allows limited longitudinal adjustment of the parts so that a fluid-tight connection is presented yet the distance between the elbow body 14 and the socket 13 can be longitudinally adjusted yet the swivel adapter 12 and socket 13 threaded thereto can still swivel or rotate. Thus, slight misalignments and/or hose distances can be quickly and easily accommodated.

The foregoing embodiment in FIGS. 1 to 4 illustrate a nipple having a forged elbow connection. As seen in FIG. 5, wherein like numerals refer to like parts of the embodiment of FIGS. 1 to 4, a fitting assembly 57 is shown having a nipple 58 which is integrally formed with an elbow connection 59. The elbow connection 59 and nipple 58 comprises a conventional piece of metal tubing which is bent at a right angle, one end of which forms the nipple 58 while the other end is rotatably connected to a female coupling member 60.

While the swivel adapter 12 and socket 13 are identical to those shown in the two previous exemplary embodiments, the nipple 58, due to the method of construction, differs. More specifically, prior to bending the tubing which forms the elbow connection and the nipple, the elongated substantially cylindrical portion 26 is formed by turning down the wall of the tubing to a lesser diameter so as to form a slightly enlarged portion 61. To form the complete enlarged portion 62, it is necessary to increase the diameter of the portion 61 by positioning an annular band 63 over the nipple portion of the tubing so that one edge of the band is axially aligned with the shoulder formed where the enlarged portion 61 of the tubing joins the elongated portion 26. The annular band 63 is then brazed or otherwise permanently secured, as at 64, to the portion 61 of the tubing so as to form the complete enlarged portion 62. Of course, the annular band 63 is provided on its exterior surface with the annular recesses 30 and groove 51 for receiving the O-ring 37 and wire connector 48. It will therefore be apparent that a fitting assembly may be constructed by using a forged elbow connection as in FIGS. 1–4 with subsequent machining or an ordinary conventional piece of tubing may be used suitably machined and brazed so as to have an annular band which forms the enlarged portion 62 as shown in FIG. 5.

The assembly and operation of the fitting assembly 57 of the embodiment of FIG. 5 is identical to the embodiment shown in FIGS. 1 to 4 and further discussion thereof is deemed unnecessary.

Still another embodiment of the invention is shown in FIG. 6. In this embodiment, where again like numerals refer to like parts of the embodiment of FIGS. 1 to 4, a portion of a straight fitting assembly 65 is shown also having a nipple 66, a swivel adapter 12, a socket (not shown), and a coupling member 67. Nipple 11 in this embodiment does not have an elbow body but is coupled directly to coupling member 67. This is accomplished by providing an enlarged integral portion 68 at the rearward end of nipple 66 having an internal diameter equal to the internal diameter of the remainder of the nipple and having an outwardly flared opening at its rearward end. The further enlarged diameter portion 68 joins the enlarged diameter portion 28 so as to form an external shoulder 69. Female coupling member 67 completes the fitting assembly and, in the exemplary embodiment shown in FIG. 6, comprises a member having a conventional hexagonal outer surface with internal threads 70 adapted to be matingly engaged to a male threaded connection. Internally, at the forward end of the member 67, the internal diameter is slightly larger than the external diameter of the further enlarged portion 68 of nipple 60 and at its forwardmost end the member has an opening 71 with a diameter slightly larger than the enlarged portion 28 of nipple 11 so that an internal shoulder is formed which will matingly engage with the external shoulder 69 of the nipple 66. Such construction is entirely conventional and well known in the art.

Similar limited adjustment means 45 is provided on nipple 66 and the assembly and operation thereof is identical to the assembly and operation of the embodiment illustrated in FIGS. 1 to 4.

As seen in FIG. 7, the straight fitting there shown is identical in all respects to the fitting shown in FIG. 6 except for the non-hose-connecting portion. Instead of the female coupling member 67, which is rotatable relative to the nipple 66, the male end 72 is integral with the nipple 66 and thus rotates therewith.

In all embodiments, the groove or recess 51 receiving pin or wire member 48 therein allows the nipple to move in and out in an axial direction which in turn allows linear adjustment of the final hose assembly. The assemblies discussed hereinabove can be used on any suitable hose construction, such as Teflon hose.

The advantage of the construction of the present invention is particularly apparent from the elbow connections shown in FIGS. 1–4 and the nonrotating end portion fitting shown in FIG. 7. With conventional constructions, if an elbow connection is secured at each end of a hose and one end is secured, the free elbow end may not be properly aligned as required to be secured. The latter elbow connection must be rotated, therefore, but such rotation will break the seal between the nipple and the inner tube of the hose. On the other hand, with the present invention, one elbow connection when rotated relative to the other will break only the seal between the outer surface of the nipple portion and the hose but not between the inner surface of the sleeve portion of the swivel adapter which also seals against the exterior surface of the inner flap of the hose as previously explained.

The male end fitting of FIG. 7 also permits rotation of the connecting portion of the fitting while only breaking one seal. Thus, the present invention when used with rotatable connection portions integral with the nipple is superior to presently available connections as commonly used on neoprene hose.

Of course, other modifications and variations of the present invention are possible as will be apparent to those having skill in the art without departing from the scope of the invention.

I claim:

1. In a hose and fitting assembly, the hose having an inner fluid sealing tube and an outer tubular reinforcement, the fitting assembly being of the lip-seal detachable and reusable type, the assembly including a nipple having an elongated substantially cylindrical portion received in the fluid sealing tube, an integral enlarged diameter substantially cylindrical portion, and a shoulder portion joining said cylindrical portions, said enlarged portion outer surface having an annular O-ring recess therein axially adjacent said shoulder, an integral swivel adapter including a substantially cylindrical sleeve portion with an inner diameter greater than the outer diameter of said nipple elongated cylindrical portion so as to define an annular space therebetween receiving at least a portion of the lip-seal portion of said hose inner tube, said sleeve portion having external threads and a forwardly extending portion having a sharp edge, said adapter including a nut portion with an inner generally uniform diameter greater than the inner diameter of said sleeve portion so as to define an internal annular shoulder between said nut portion and said sleeve portion, the inner diameter of said nut portion being only slightly larger than the external diameter of the enlarged portion of said nipple for receiving said enlarged portion in snug relation, an O-ring disposed in said O-ring recess, a socket receiving said adapter sleeve portion and said nipple elongated cylindrical portion, said socket having an internally threaded section adjacent one end for threaded engagement with said adapter, an intermediate section having a diameter greater than the external diameter of said forwardly extending portion so as to define an annular space receiving said hose outer tubular reinforcement, and a remaining section having an axially rearwardly decreasing diameter and means for gripping said reinforcement when said socket is axially advanced by threaded engagement with said sleeve portion thereby forcing a portion of said hose inner tube into said annular space between said sleeve portion and nipple and forcing said other portion of said hose and said reinforcement into said annular space between said sleeve portion and said socket, the improvement which comprises:

limited longitudinal axially adjustable and connecting means associated with both said swivel adapter and said nipple for allowing limited longitudinal adjustment of said swivel adapter with respect to said nipple in the axial direction thereof while coupling said swivel adapter to said nipple in a fluid-tight manner, said limited longitudinal axially adjustable and connecting means including an annular connector wire recess in the inner wall of said nut portion, the outer wall enlarged portion of said nipple having an annular groove therein extending longitudinally in the axial direction of said nipple having generally vertical and essentially flat stop shoulders at each end thereof, said annular groove being essentially flat and linear and the plane thereof extending generally normal to the plane of said stop shoulders, and a wire connector member disposed in both said annular wire recess and said annular groove when in registry to prevent disengagement of said swivel adapter from said nipple while permitting relative rotation therebetween and limited axial movement of said swivel adapter with respect to said nipple in the axial direction thereof.

2. In the assembly of claim 1 wherein the outer diameter of said wire connector member is substantially less than the distance between said stop shoulders.

3. In the hose and fitting assembly of claim 1 wherein said nipple is fixedly mounted to an elbow connection.

4. In the hose and fitting assembly of claim 3 wherein said elbow connection and nipple are integral.

5. In the hose and fitting assembly of claim 4 wherein said elbow connection and said nipple elongated cylindrical portion have substantially the same external diameter and said nipple enlarged portion comprises an annular band received on said nipple and fixedly secured thereto.

6. In the hose and fitting assembly of claim 1 wherein said nipple is fixedly mounted to a male end connecting portion.

7. In the hose and fitting assembly of claim 1 wherein said nipple has a further enlarged integral portion, and a second shoulder joining said enlarged and further enlarged portions, and additionally including a female coupling member having an internal diameter extending from one end greater than the external diameter of said nipple further enlarged portion and a reduced diameter opening at the opposite end, said reduced diameter being greater than the enlarged portion of said nipple so as to define an internal shoulder for engagement with said nipple second shoulder.

* * * * *